(No Model.)

P. G. SALOM.
PROCESS OF MAKING COMMERCIAL LEAD FROM LEAD ORE.

No. 584,242.   Patented June 8, 1897.

2 Sheets—Sheet 1.

UNITED STATES PATENT OFFICE.

PEDRO G. SALOM, OF PHILADELPHIA, PENNSYLVANIA.

PROCESS OF MAKING COMMERCIAL LEAD FROM LEAD ORE.

SPECIFICATION forming part of Letters Patent No. 584,242, dated June 8, 1897.

Application filed May 15, 1893. Serial No. 591,694. (No specimens.)

*To all whom it may concern:*

Be it known that I, PEDRO G. SALOM, a citizen of the United States, residing in Philadelphia, Pennsylvania, have invented an Improved Process of Making Commercial Lead from Lead Ore, of which the following is a specification.

The object of my invention is the manufacture of commercial lead from lead ore without the employment of heat. This object I attain by subjecting lead ore, such as galena, (sulfid of lead,) to the reducing action of hydrogen evolved by electrolytic action, thereby producing a spongy lead and then compressing such spongy lead into solid commercial lead.

Figure 1:
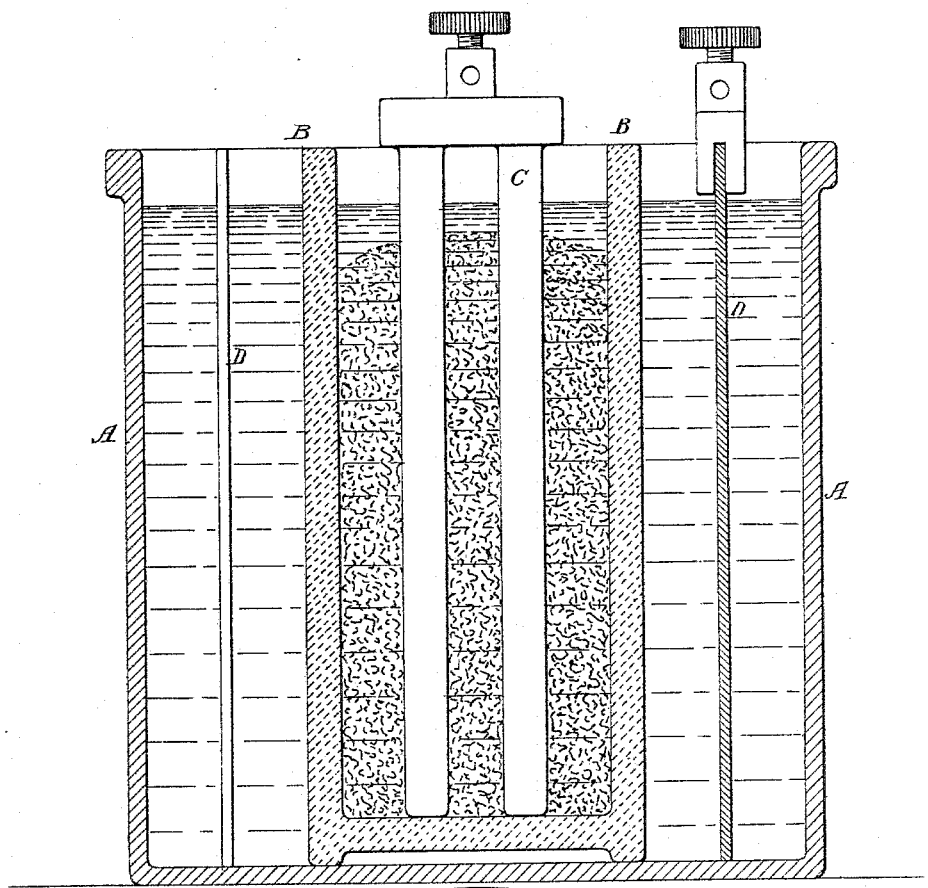
Figure 2:
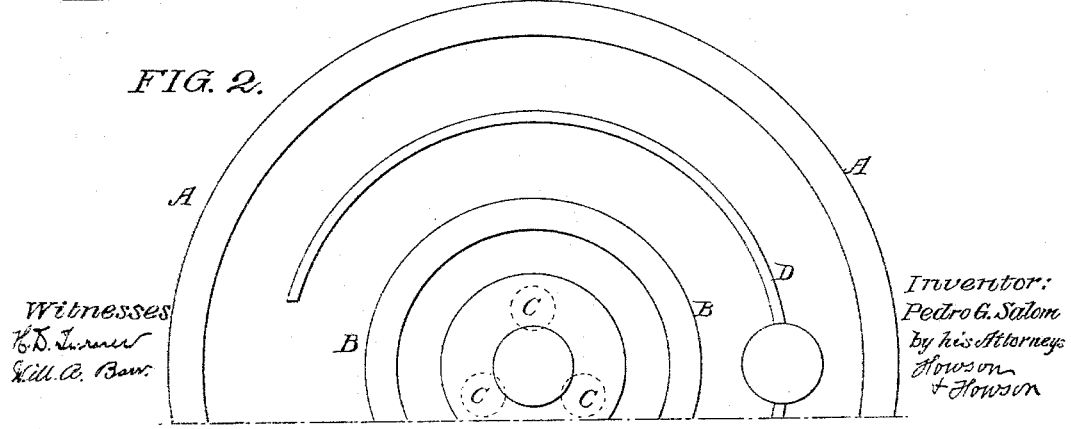
Figure 3:
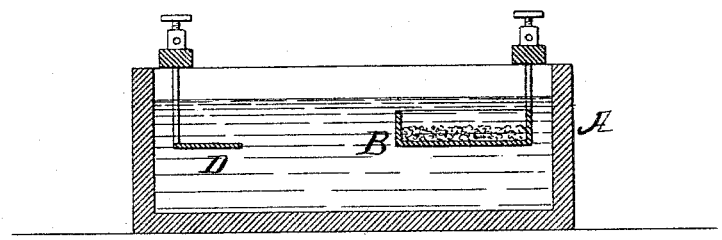
Figure 4:
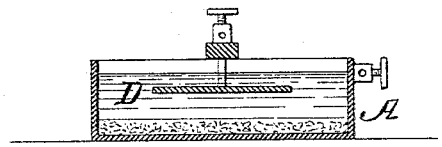
Figure 5:
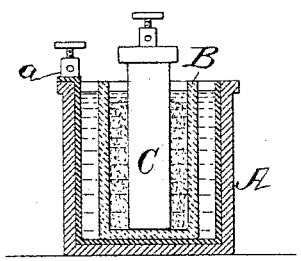

In the accompanying drawings, Figure 1 represents a sectional elevation of apparatus which may be employed in carrying out my invention. Fig. 2 is a plan view thereof; and Figs. 3, 4, and 5 are sectional elevations of various modified forms of apparatus for carrying out the invention.

I do not, however, desire to confine myself to the employment of any particular form of apparatus, as different forms which will readily suggest themselves to those skilled in the art may be used.

In the apparatus shown in the drawings, A represents a suitable vessel containing the electrolytic fluid, which may consist, for example, if the ore being treated is a sulfid, of an aqueous solution of sulfuric acid.

Within the vessel A is a porous cup B, in which is placed the lead ore from which the metal is to be reduced, the ore having preferably been brought to a powdered state before being placed in the vessel. Within the porous cup B is a cathode C, consisting in the present instance of two or more bars of lead connected with the negative pole of a dynamo-electric machine, or other suitable generator of electricity. Immersed in the electrolytic fluid is an anode D, consisting in the present instance of a plate of lead, and which is connected to the positive pole of the electric generator.

The apparatus above described being supplied with the lead ore to be operated on and connected with an electric generator the operation will be as follows: The electric current passing through the positive electrode D and thence through the electrolyte to the negative electrode or cathode C will there liberate hydrogen, which acts to reduce the metal from the ore under treatment by liberating therefrom (if the ore under treatment be a sulfid) sulfur, which, combining with the hydrogen, passes off in the form of sulfureted hydrogen, leaving in the porous cup a spongy metallic lead, which may be removed therefrom at the close of the operation, or from time to time as the reduction proceeds.

It will be understood that the apparatus used to carry out my invention may be varied in form and in details without varying or materially affecting the mode of operation or result—as, for example, the ore, instead of being placed in a porous cup, may be placed in a vessel made of a material which is a good conductor, as, *e. g.*, lead, said vessel being suitably directly connected with the negative pole of the electric generator. In this latter case the ore under treatment and the ore-containing vessel together form the negative electrode or cathode, as is illustrated by Fig. 3 of the drawings, which represents apparatus wherein an ore-containing vessel B, made of or lined with lead, is suspended in vessel A and, with the contained ore, constitutes the cathode, the anode D being also suspended within the vessel A; or a special containing-vessel for the ore may be dispensed with altogether and the vessel A, being formed of or lined with a good conducting material, as, *e. g.*, lead, may be itself used as the receptacle for the ore, forming therewith the negative electrode or cathode. The positive electrode or anode in that case may be conveniently formed of a plate or sheet of lead or other suitable conductor suspended above the ore in the electrolytic fluid. This modification is illustrated by Fig. 4 of the drawings, showing apparatus in which the ore to be acted upon is placed directly in vessel A, the latter being in this case made of or lined with lead, connected directly with the negative pole of an electric generator and so forming (with the ore) the cathode, anode D, of lead or other suitable conductor, being suspended above the ore, as shown.

It will also be understood that if the vessel A be made of or lined with a suitable conducting material and connected directly with the positive pole of the electric generator it may serve as the positive electrode or anode, thus dispensing with plate D. This construction is exemplified in Fig. 5 of the drawings, in which vessel A, containing the electrolytic fluid and made of or lined with lead, is, through binding-post $a$ and a suitable conductor, connected directly with the positive pole of the electric generator, and so forms the anode, C being the cathode within porous cup B, which also contains the pulverized ore to be acted upon.

It will also be understood that my process differs materially from that of obtaining by electrolysis a precipitation of metallic lead from a solution of a salt of that metal used as an electrolyte, the strength of the metallic solution being maintained by metal dissolved from the anode during the process. In my process the electrolyte used is a weak solution of sulfuric acid or other fluid in which the lead ore is practically insoluble and there is practically no action of the solution upon the anode, for which a plate of carbon, for example, may be used instead of the lead plate hereinabove particularly specified.

Various substances may be used to form the electrodes, as also for the electrolytic fluid, according to the character of the ore to be treated and having always in view the employment of the electrolytic fluid simply as a conductor and for the development of nascent hydrogen and action of the latter upon the ore.

The spongy lead, produced as hereinabove described, I subject to hydraulic or other pressure to compress it into solid commercial lead, care being taken that the lead sponge when subjected to this pressure shall not have been oxidized to an extent sufficient to prevent its being compacted, or, as it may be properly termed, "cold welded," into a solid commercial lead. To this end the step of compression should be taken immediately after the formation of the sponge, or if for any reason any considerable time is to elapse between the formation and the compression of the sponge the latter should, during the interval, be protected from the atmosphere or other cause of oxidation. By thus compressing the spongy lead, produced as hereinabove described, I bring said lead into a shape available for commercial purposes or for any of the uses to which ordinary pig-lead is applied.

The spongy lead may be washed to remove any traces of acid or mechanically-suspended impurities before compression. The pig-lead formed by my process, while applicable, as above stated, to any of the purposes for which ordinary pig-lead is used, is yet readily distinguishable therefrom in appearance.

I claim as my invention—

The process of converting lead ore into commercial lead, without the application of heat, by subjecting the ore to the action of nascent hydrogen, electrolytically developed, producing thereby a spongy mass, and afterward, while the mass is in a non-oxidized condition, applying a consolidating pressure thereto, substantially as described.

In testimony whereof I have signed my name to this specification in the presence of two subscribing witnesses.

PEDRO G. SALOM.

Witnesses:
WILL. A. BARR,
JOS. H. KLEIN.